`US005999529A`

United States Patent [19]
Bernstein et al.

[11] Patent Number: 5,999,529
[45] Date of Patent: Dec. 7, 1999

[54] METHOD AND APPARATUS FOR INTERWORKING ATM ADAPTATION LAYER FORMATS

[75] Inventors: Greg M. Bernstein, Fremont; Jeffrey T. Gullicksen, San Jose, both of Calif.

[73] Assignee: Nortel Networks Corporation, Canada

[21] Appl. No.: 08/931,649

[22] Filed: Sep. 16, 1997

[51] Int. Cl.$^6$ .................................................. H04Q 11/04
[52] U.S. Cl. ........................... 370/376; 370/535; 370/542
[58] Field of Search ....................... 370/465, 466, 370/467, 469, 389, 468, 474, 516, 517, 438, 439, 376, 476, 395, 535, 542

[56] References Cited

U.S. PATENT DOCUMENTS 4,972,407  11/1990  Kawai ..................................... 370/376
5,627,826   5/1997  Kameda et al. ........................ 370/376

*Primary Examiner*—Douglas W. Olms
*Assistant Examiner*—Kenneth Vanderpuye
*Attorney, Agent, or Firm*—Finnegan, Henderson, Farabow, Garrett & Dunner, L.L.P.

[57] ABSTRACT

A plurality of voice-over-ATM modules operate in parallel and each processes at least one type of AAL. Interface circuitry and contention circuitry allow the parallel modules to interact. The result is an interworking between ATM streams and different types of equipment.

46 Claims, 4 Drawing Sheets

DELAY AND BANDWIDTH REQUIRED FOR DIFFERENT SIZE "TRUNKS" IN THE VOICE OVER ATM MULTIPLEX FORMATS

| NUMBER OF DS0's PER CELL | NUMBER OF BYTES FROM EACH DS0 | ATM BANDWIDTH PER VC | DELAY IN mSEC |
|---|---|---|---|
| 1 | 48 | 70,667 | 6 |
| 2 | 24 | 141,333 | 3 |
| 3 | 16 | 212,000 | 2 |
| 4 | 12 | 282,667 | 1.5 |
| 6 | 8 | 424,000 | 1 |
| 8 | 6 | 565,333 | 0.75 |
| 12 | 4 | 848,000 | 0.5 |
| 16 | 3 | 1,130,667 | 0.375 |
| 24 | 2 | 1,696,000 | 0.25 |
| 48 | 1 | 3,392,000 | 0.125 |

METHOD AND APPARATUS FOR INTERWORKING ATM ADAPTATION LAYER FORMATS

I. BACKGROUND OF THE INVENTION

The present invention relates to the field of accommodating different network formats, and more particularly to the field of interworking ATM adaptation layer formats.

Differing delay and bandwidth efficiency requirements, as well as market forces and emerging standards, have led to several different Asynchronous Transfer Mode (ATM) adaptation layers (AALs) for transporting voice or n×64 kbps services over ATM. To achieve end-to-end connectivity, however, these AALs need to be "interworked" at some point in the public, private, or customer premises networks.

Presently, AAL-1 is the only standardized AAL for carrying voice and n×64 transport, and it does so in three different ways. T1 or E1 circuit emulation; n×64 structured data transfer (SDT); or single-call-per-channel (simplified AAL-1). All of these methods have some limitations.

For example, circuit emulation merely provides T1 or E1 transport, and the AAL does not know whether the T1 or E1 contains voice or n×64 services. Also, although SDT can be used for multiplexing several voice channels, and in doing so can reduce the cell fill delay by an amount proportional to n (to a minimum of 125 $\mu$S), bandwidth inefficiency due to trunking effects can make AAL-1 SDT-based n×64 unacceptable in some applications. Finally, simplified AAL-1 specifies how a single voice call or 64 kbps channel is adapted into a single ATM virtual channel, but this introduces approximately 6 msec of delay, making this technique unacceptable in some applications.

Although AAL-1 may have been designed with voice in mind, a data-oriented AAL, AAL-5, resides on ATM network interface cards (NIC) designed for personal computers and workstations. Hence, the market and standards organizations would like to put voice and n×64 over AAL-5: This would be a single call per channel with a cell fill of either 32 or 40 bytes. Other proprietary AALs have been designed to optimize two of the following three criteria: delay minimization bandwidth efficiency, and implementation complexity and cost.

U.S. Ser. No. 08/746,176, filed on Nov. 7, 1996, describes a family of AALs with low implementation complexity that offered a range of tradeoffs between bandwidth efficiency and delay minimization. These are shown schematically in FIG. 1.

There is a need, therefore, for a flexible system and process to accommodate voice or 64 kbps services over ATM. There is also a need for such a system and method to provide interworking of such ATM services with standard networks.

II. SUMMARY OF INVENTION

Systems and methods consistent with this invention combine unique aspects of both ATM and Time Division Multiplexing (TDM) technology to produce an innovative parallel processing architecture for voice-over-ATM interworking. The architecture is not only flexible and scalable, but it can also be implemented using current technologies.

Specifically, an interworking device consistent with this invention and receiving a first data stream carrying voice in a plurality of formats comprises: a plurality of voice data processing modules capable of operating in parallel, each of the modules including first means for converting the first data stream from one of the plurality of formats to a data stream in an intermediate format, and second means for converting data streams in the intermediate format to a second data stream, a router for sending to the appropriate one of the modules portions of the first data stream with the corresponding formats; and a switch for switching the data stream in the intermediate format between different one of the modules.

A method consistent with this invention of interworking a first data stream carrying voice in a plurality of formats comprises the steps of: processing portions of the data stream in parallel, the processing including converting the corresponding first data stream portions from one of the plurality of formats to a data stream in an intermediate format, and converting data streams in the intermediate format to a second data stream; sending to the appropriate one of the modules portions of the first data stream with the corresponding formats; and switching the data stream in the intermediate format between different one of the modules.

Both the foregoing general description and the following detailed description are exemplary and explanatory only and do not restrict the invention as claimed. The accompanying drawings, which are incorporated in and constitute a part of this specification, illustrate embodiments considered with the invention and, together with the description, explain the principles of the invention.

III. BRIEF DESCRIPTION OF DRAWINGS

IV. DETAILED DESCRIPTION

Reference will now be made in detail to embodiments consistent with this invention that are illustrated in the accompanying drawings. The same reference numbers in different drawings generally refer to the same or like parts.

Figure 2:
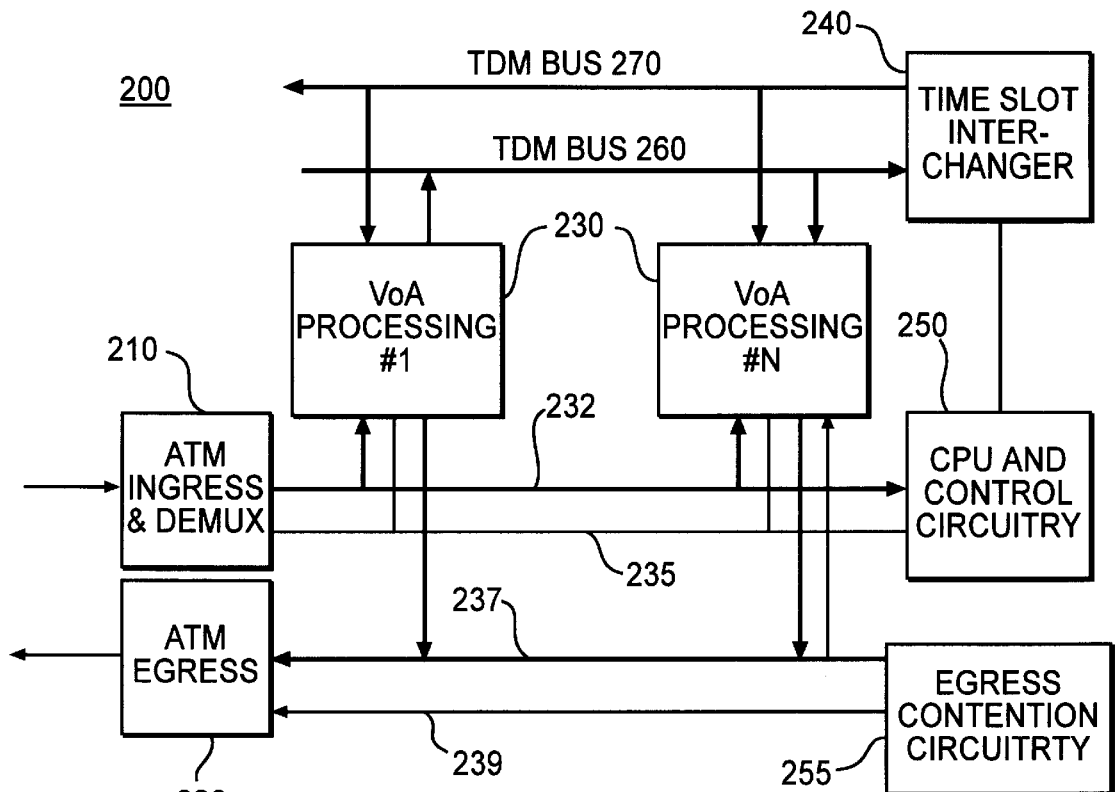
FIG. 2 is a block diagram of an interworking device consistent with this invention.

FIG. 2 is a block diagram of an interworking device 200 consistent with this invention. Device 200 includes six major components: (1) ATM Ingress and Demultiplex or Router circuitry 210; (2) ATM Egress circuitry 220; (3) Voice-over-ATM (VoA) processing modules 230; (4) TDM-based Time Slot Interchanger (TSI) 240, (5) CPU and control circuitry 250; and (6) Egress Contention Circuitry 255.

ATM Ingress and Demultiplex or Router circuitry 210 receives ATM cells from ATM network 205, and sends each cell to the appropriate VoA processing module 230 via busses 232 and 235. Each module 230 processes at least one type of VoA AAL. Interworking occurs when a VoA processing module 230 receives a specific VoA AAL. That module processes the information, places the resulting bytes into a TDM1 stream onto TDM bus 260 using the slots reserved for that VoA module, and sends those bytes to TSI 240. TSI 240 then places these bytes onto TDM bus 270 in slots reserved for a different VoA processing module 230. Module 230 takes the byte stream from bus 270, formats the bytes into a cell with a different VoA AAL, and sends the newly-created cell via busses 237 and 239 to ATM Egress circuitry 220 for transmission out of device 200 to ATM network 205.

ATM Ingress and Demultiplex or Router circuitry 210 may also modify the ATM cell header (via VPI/VCI translation) or otherwise indicate to the receiving VoA module 230 the ATM virtual channel to which the cell that the VoA module is processing belongs. Circuitry 210 can also provide cell buffering, although buffering cells at this point in the architecture can produce "head-of-line" blocking and thus may not be appropriate.

Figure 3:
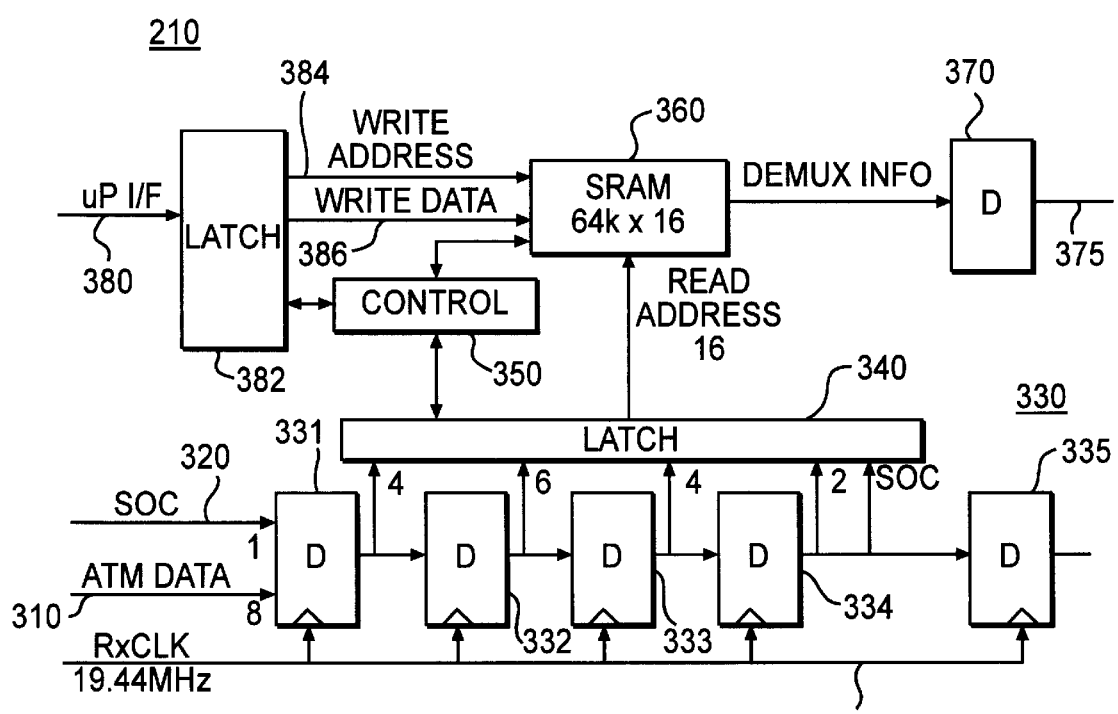
FIG. 3 is a diagram of ATM Ingress and Demultiplex circuitry of the device in FIG. 2.

FIG. 3 is an overall diagram of ATM1 Ingress and Demultiplex or Router circuitry 210. The key design parameters for circuitry 210 are the number of VoA modules 230 possible in device 200 and the total number of ATM VCs that device 200 receives. Ingress and Demultiplex or Router circuitry 210 receives ATM data on line 310, a Start of Cell (SOC) clock on line 320, and a 19.44 MHZ Receive Clock (RxClk) on line 325.

Circuitry 210 translates the network VPI:CI numbers into a "triplet" of identifiers: VoA module number, VC number or that module, and an identification of the type of data. The data type indicates whether the data is voice, OAM, or signaling. Preferably, if each module can handle M virtual connections for voice, where M depends on the module number, the VC numbers range from 0 to M-1.

FIG. 3 shows a possible implementation of circuitry 210. As shown, circuitry 210 includes a header extraction circuit 330 that finds the header of each packet and examines the VPI/VCI bits. FIG. 3 shows header extraction circuit 330 as a shift register with components 331, 332, 333, 334, and 335. The SOC signal causes the latch 340 to store the VPI/VCI bits.

Control circuit 350 uses tables in SRAML 360 that relate the VPI/VCI bits for the different formats to corresponding VoA modules. Control circuit 350 helps load SPAM 360 from an external processor (not shown) via HP interface 380, latch 382, Write Address line 384, and Write Data 386. The output of SRAM 360 is the VoA Module Selection information sent via interface 370 to line 375. The received packets and SOC pass from header extraction circuit 330 onto lines 232 and 235, respectively.

Figure 4:
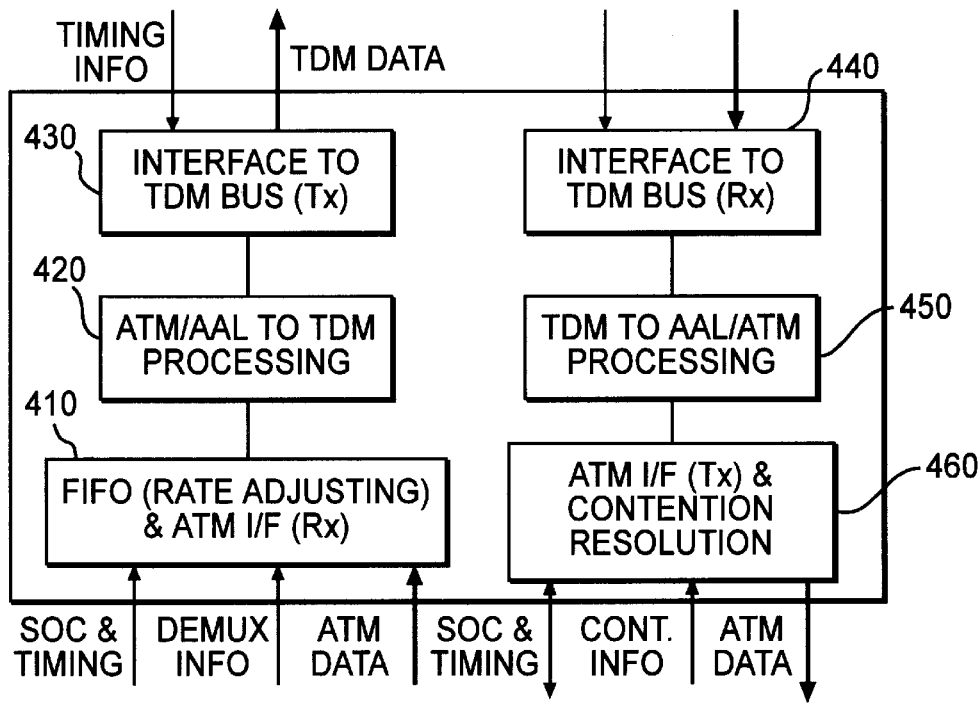
FIG. 4 is a block diagram of a VoA processing module of the device in FIG. 2.

FIG. 4 is a block diagram show one possible implementation of VoA processing module 230 consistent with this invention. Modules 230 preferably process the following VoA AALs: (1) the custom 48 DS0 format shown in FIG. 1, (2) AAL-5 single call per channel, and (3) AAL-1 (simplified) single call per channel. As systems needs change, so too will the number and types of VoA modules.

In the ATM-to-TDM direction, each module 230: (1) receives ATM cells on busses 232, 235, and 375 from the ATM Ingress and Demultiplex circuitry and performs any necessary buffering for rate adaption, (2) performs appropriate AAL processing on the cell contents to extract the voice or n×64 kbps transport bytes, (3) performs any necessary cell delay variation (CDV) dejittering; and (4) inserts transported bytes into appropriate slots onto the bus onto bus 260 for TSI 240.

Preferably, a FIFO and ATM interface 410 performs the interfacing and cell buffer functions. Cell buffering may be necessary if the VoA AAL processing cannot process at the full ATM line rate. Buffering also allows multiple, slower VoA processing modules to be used. Because the modules operate in parallel, however, they provide a higher overall throughput and allow a high degree of scalability.

ATM/AAL to TDM processing module 420 performs the appropriate AAL processing on cell contents and CDV dejittering. The processing includes unpacking the cells and changing the order of the information in accordance with the corresponding format. Each module extracts the appropriate DS0 bytes, or voice channels, according to its associated AAL. Processing and dejittering can occur in different orders depending on the AAL being processed. For example, a single call per channel would likely be dejittered on the byte stream after processing rather than on the ATM cell stream. In that situation, CDV will be typically much less than the cell fill delay, and cell-based dejittering would be too crude and would add unnecessarily long delays. For a low delay multiplex format, however, dejittering could occur before processing to reduce implementation complexity.

Interface circuitry 430 contains timing to ensure that the bytes were placed onto bus 260 during the proper times. Such circuitry is well known In the TDM-to-ATM direction, VoA processing module 230: (1) extracts appropriate bytes from TDM bus 270; (2) assembles ATM cells in accordance with the AAL it is implementing; and (3) sends out ATM cells to the egress circuitry in accordance with received contention resolution information. The speed of TDM bus 270 must be high enough to serve all the VoA modules.

To reduce the need for expensive high speed circuitry and buffering on the TDM interface, TDM slots can be assigned to VoA modules 230 nonconsecutively, such as by interleaving the slots among VoA modules 230 so that none has to process at the peak TDM bus rate. The design of a TDM interface circuit 440 is conventional, however, just needing to ensure that all bytes in the appropriate time slot of bus 270 are properly received.

A TDM-to-AAL/ATM circuit 450 assembles the ATM cells appropriately according to the corresponding AAL protocols. The design of this circuit is not important to this invention other than to ensure that it operates fast enough to keep up with the byte stream.

An ATM interface circuit 460 in VoA processing module 230 can have many different designs. For example, it may either be completely distributed in VoA modules 230, have minimal circuitry because the contention functions are completely centralized in Egress contention circuitry 255, or be partially distributed. The final design is not critical to this invention.

Figure 5:
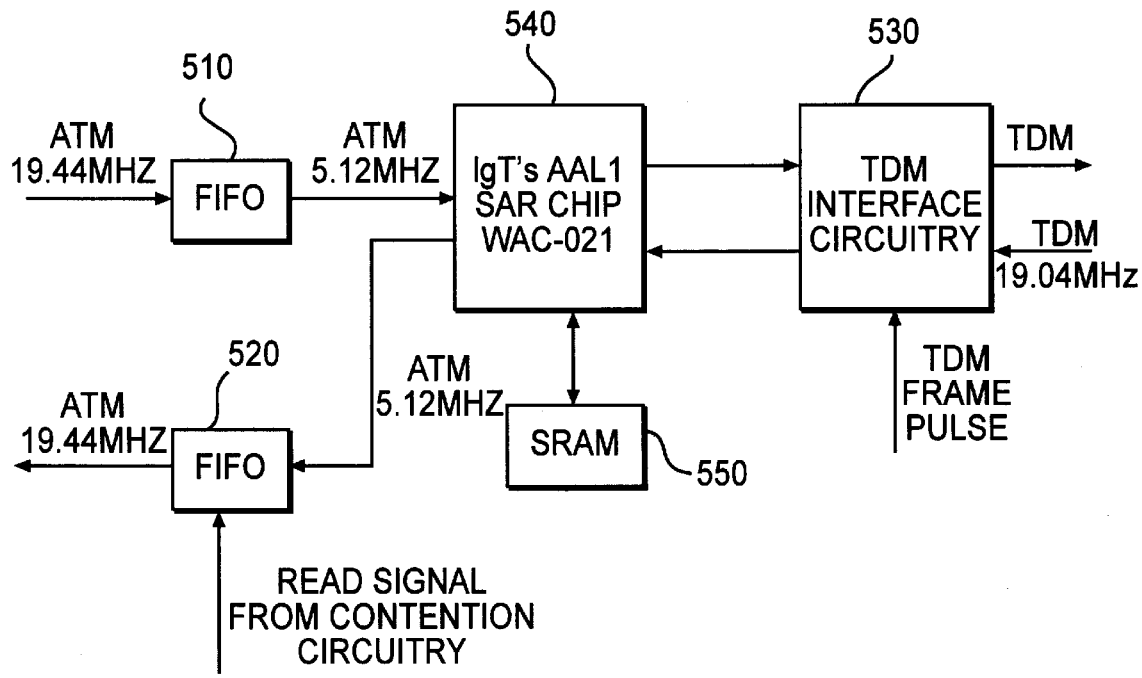
FIG. 5 is a block diagram of another implementation of a VoA processing module.

FIG. 5 shows another implementation of VoA processing module 230. For simplification, FIFO and ATM interface 410 and ATM interface circuit 460 are shown as FIFOs 510 and 520, respectively, and interface circuitry 430 and TDM interface circuit 440 are shown as a single TDM interface circuit 530. ATM/AAL to TDM processing module 420 and TDM-to-AAL/ATM circuit 540 are combined in an AAL1 SAR chip WAC-021 540 from Integrated Technologies, Inc. SRAM 550 provides temporary storage and buffering for chip 540.

Preferably, VoA processing module 230 handles the AAL1 formats of voice. This block diagram could also represent an AAL5 VoA processing module simply by replacing chip 520 with any one of the AAL5 SAR chip available from, for example, NEC Corporation, Integrated Device Technology Inc., Connectware. and Toshiba Corp..

Figure 6:
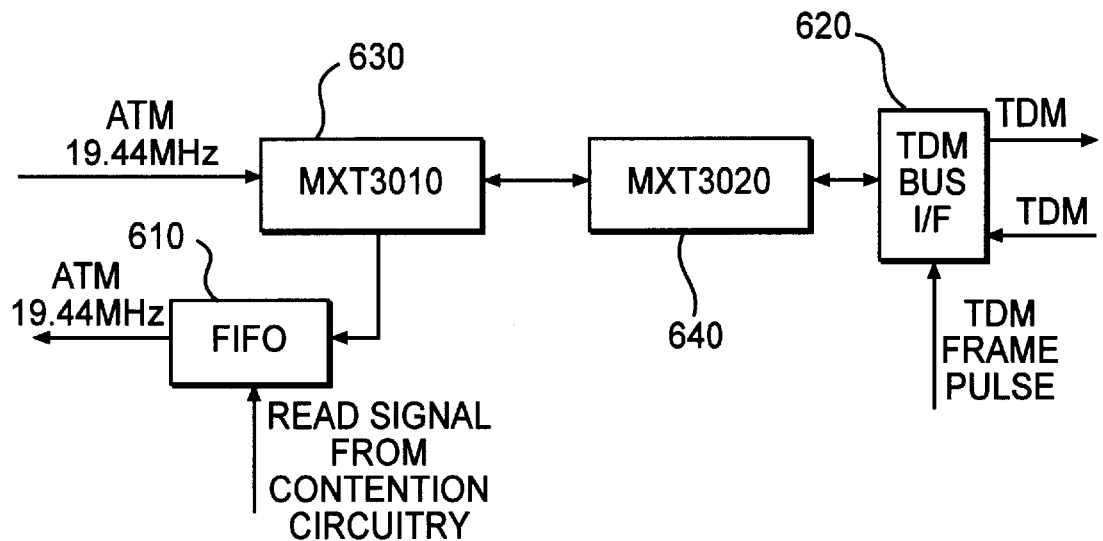
FIG. 6 is a block diagram of yet another implementation of a VoA processing module.

FIG. 6 shows how circuitry from another manufacturer, Maker Communications, can also function as VoA module 230. Along with FIFO 610 and TDM interface circuitry 620, which is similar to corresponding circuitry shown in FIG. 5, elements 630 and 640, known as modules. MXT3010 and MXT3020, can handle AAL0, AAL1, AAL5, and proprietary voice formats, although not necessarily all at once.

TSI circuit 240 can be a conventional component used in most DS0 (voice and 64 kbps) switching systems, PBXs, Central Office Switches, etc. Key criteria for circuit 240 are the speeds of busses 260 and 270 and switching capacity. An appropriate contention resolution algorithm is needed, however, to avoid excessive CDV. TSI circuit 240 uses 8-bit transmit and receive data buses plus control signals. Other TDM busses, such as MVIP or SCSA, could also be used.

CPU and control circuitry 250 is responsible for the following functions: (1) general I/O device initialization and configuration; (2) setting connection tables in TSI circuit 240; (3) setting up the ATM demultiplex tables and VPI/VCI translation tables in ATM Ingress and Demultiplex or router circuitry 210; (4) configuring VoA processing modules 230; and (5) configuring ATM egress contention resolution circuitry. In addition, control circuitry 250 may be responsible for timing recovery and distribution.

Figure 7:
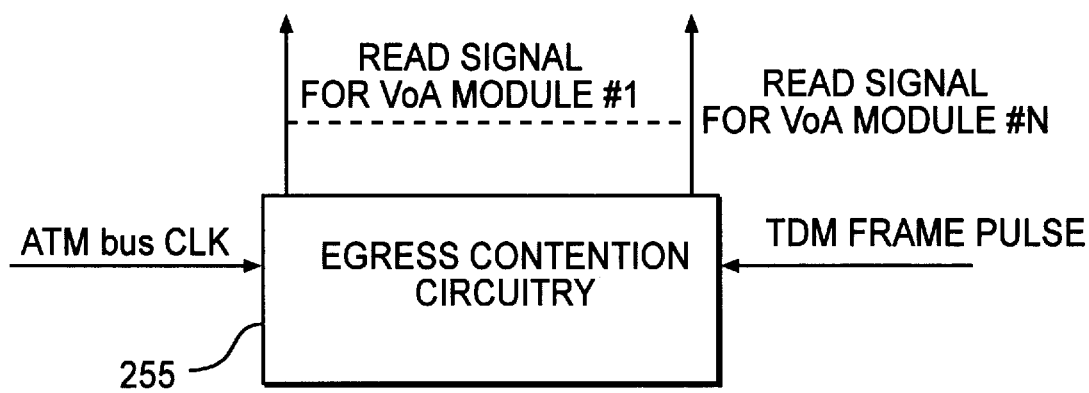
FIG. 7 is a block diagram of an egress contention circuit of the device in FIG. 2.

FIG. 7 shows a block diagram of Egress Contention Circuitry 255. Circuitry 255 arbitrates the access of VoA modules 230 to Egress Circuitry 220 and ATM 205. Circuitry 255 receives the ATM bus clock and a TDM frame pulse clock and controls read signals for the various modules 230. One means of arbitration uses round-robin polling, which works well because the sum of the bandwidths at the output of VoA modules 230 is less than or equal to the bandwidth of the egress ATM bus 225.

The main sizing for device 200 depends on the bandwidth of ATM busses 232, 235. TDM busses 260, 270 should have at least the same capacity to avoid underutilizing the ATM link connected to device 200. Assuming that ATM link was an STS-3c ATM link at 155.52 Mbps, it can accommodate 2119 DS0s with a minimum overhead custom AAL, assuming no compression. Accordingly, TDM busses 260, 270 should support approximately 2000 DS0s (e.g., 8 bits at 16.4 MHZ). Because signaling overhead and queuing effects prevent the ATM link from being fully used, the bandwidth of the TDM busses can be close to the maximum.

ATM busses 232, 235, 237, 239 are preferably a standard UTOPIA parallel busses used to connect ATM and AAL integrated circuits. Those busses are 8-bit receive and transmit buses that are clocked at a minimum of 19.44 MHZ (for STS-3c).

For egress contention with an STS-3c signal carrying ATM, slightly more than 44 cells can be transported every 125 $\mu$S, the byte time for a DS0 signal. Dividing internal ATM UTOPIA bus 237, 239 into 44 slots, which is 99.6% efficient of STS-3c ATM bandwidth, allows use of a slightly lower byte clock of 18.66 MHZ synchronized to 125 $\mu$S.

In addition to this clock, Egress contention circuitry 255 (generates a 125 $\mu$S frame clock and a SOC clock every 2.84 $\mu$S. All these clocks are synchronous so, for example, a frame always starts on a cell boundary. These 44 ATM egress time slots are assigned to VoA modules 230 based on their bandwidth needs. VoA modules 230 are responsible for scheduling egress on the slots that they have been assigned.

Figure 1:
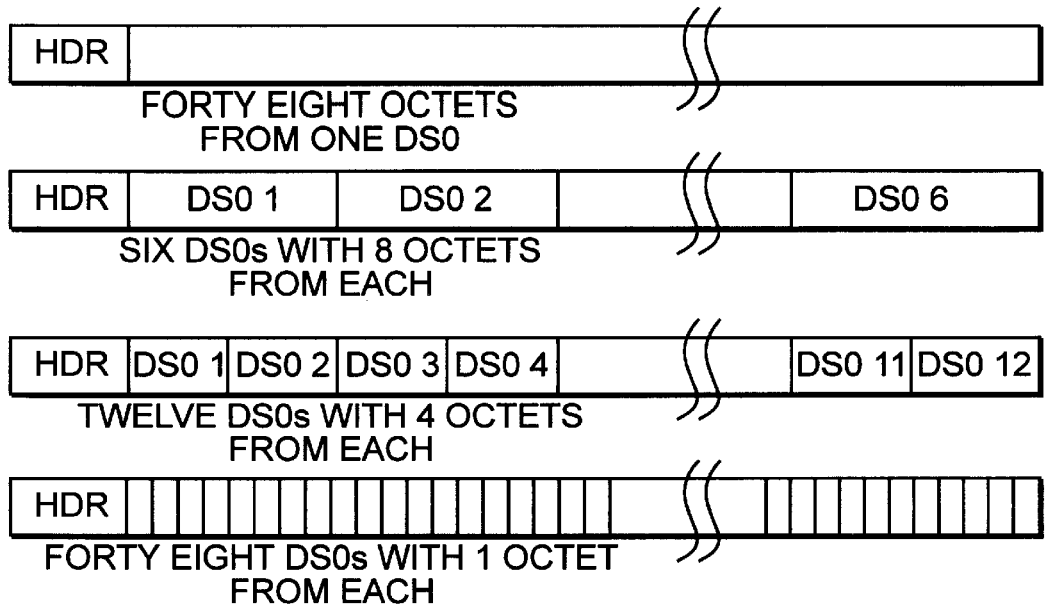
FIG. 1 is a table of the characteristics of a family of AALs.

As is apparent from this description device 200 is extremely flexible and scalable. For example, one possible configuration for device 200 in FIG. 1 is as follows: (1) one VoA module 230 handling the proprietary (ATM DS-48) format in FIG. 1, with a capacity for 20 ATM VC and corresponding to 960 DS0; (2) one VoA module 230 handling simplified AAL-1 single channel adaptation (47 byte fill) with a capacity for 470 ATM VCs (470 DS0s); and (3) two VoA modules 230 handling AAL-5 40 byte fill single channel adaptation, each module with a capacity of 240 ATM VCs (240 DS0s). The VoA module 230 handling the proprietary (ATM DS-48) format requires one egress slot per ATM VC. The VoA module 230 handling simplified AAL-1 single channel adaptation requires one egress slot per 47 VCs. The two VoA modules 230 handling AAL-5 40 byte fill single channel adaptation requires one egress slot per 40 VCs. This configuration uses 42 of the 44 available egress slots.

Other embodiments consistent with this invention will be apparent to those skilled in the art from consideration of the specification and practice of the invention. The specification and examples should therefore be considered as exemplary. The true scope and spirit of the invention are determined by the following claims.

What is claimed is:

1. An interworking device receiving a first data stream carrying voice in a plurality of formats, the device comprising:

a plurality of voice data processing modules capable of operating in parallel, each of the modules including
first means for converting the first data stream from one of the plurality of formats to a data stream in an intermediate format, and
second means for converting data streams in the intermediate format to a second data stream;
to a router for sending to the appropriate one of the modules portions of the first data stream with the corresponding formats; and
a switch or switching the data stream in the intermediate format between different ones of the modules.

2. The device of claim 1 wherein the first data stream includes packets with headers, and wherein the router includes
means for extracting the headers from the packets,
means for evaluating the headers to determine the formats of the corresponding packets, and
means for causing the packets to arrive at the module corresponding to their formats.

3. The device according to claim 1 further including
a time-division-multiplexed bus connecting the voice data processing modules and the router.

4. The device of claim 1 wherein the first means includes
means for receiving the first data stream,
means for processing the first data stream to extract information according to the format corresponding to that module, and
means for formatting the extracted information in the intermediate format.

5. The device of claim 4 wherein the first means also includes
buffering means for rate adaption.

6. The device of claim 4 wherein the first means also includes
means for performing cell delay variation compensation.

7. The device according to claim 4 further including
a time-division-multiplexed bus connecting the voice data processing modules.

8. The device of claim 7 wherein the means for formatting the extracted information into the intermediate format includes means for placing the extracted information into appropriate slots in the time-division-multiplexed bus.

9. The device of claim 4 wherein the second means includes
means for assembling needed information from the intermediate format,
means for organizing the assembled information according to the format corresponding to this module, and
means for placing the organized information into the second data stream.

10. The device according to claim 9 further including
a time-division-multiplexed bus connecting the voice data processing modules.

11. The device of claim 10 wherein the means for assembling includes
means for selecting the information from appropriate slots of the time-division-multiplexed bus.

12. The device of claim 1 wherein the switch includes
an egress control circuit for arbitrating among the voice data processing modules.

13. The device of claim 1 further comprising
a time slot interchanger coupled to the voice data processing modules.

14. The device of claim 1 wherein the router includes
ATM ingress circuitry coupled to the voice data processing modules.

15. The device of claim 14 wherein the ATM ingress circuitry includes
header extraction circuitry for extracting a VPI/VCI header from the first data stream.

16. The device of claim 15 wherein the ATM ingress circuitry includes
means for forming module identification signals from the extracted header.

17. The device of claim 15 wherein the ATM ingress circuitry includes
means for forming data type signals from the extracted header.

18. A method of interworking a first data stream carrying voice in a plurality of formats, the method comprising the steps of:
processing portions of the data stream in parallel, each processing including
converting the corresponding first data stream portions from one of the plurality of formats to a data stream in an intermediate format, and
converting data streams in the intermediate format to a second data stream;
sending to an appropriate one of a plurality of modules portions of the first data stream with the corresponding formats; and
switching the data stream in the intermediate format between different ones of the modules.

19. The method of claim 18 wherein the first data stream includes packets with headers, and
wherein the sending step includes the substeps of
extracting the headers from the packets,
evaluating the headers to determine the formats of the corresponding packets, and
causing the packets to arrive at the module corresponding to their formats.

20. The method of claim 18 wherein the step of converting the corresponding first data stream portions includes the substeps of receiving the first data stream,
processing the first data stream to extract information according to the format corresponding to that module, and
formatting the extracted information in the intermediate format.

21. The method of claim 18 wherein the step of converting the corresponding first data stream portions includes the substep of
buffering the first data stream.

22. The method of claim 20 wherein the step of converting the corresponding first data stream portions includes the substep of
performing cell delay variation compensation.

23. The method of claim 22 wherein the step of formatting the extracted information into the intermediate format includes the step of
placing the extracted information into appropriate slots in a time-division-multiplexed bus.

24. The method of claim 20 wherein the step of converting data streams to a second data stream includes the substeps of
assembling needed information from the intermediate format,
organizing the assembled information according to the format corresponding to this module, and
placing the organized information into the second data stream.

25. The method of claim 24 wherein the substep of assembling includes the substep of selecting the information from appropriate slots of the time-division-multiplexed bus.

26. The method of claim 18 further including the step of
forming module identification signals from the extracted header.

27. The method of claim 18 further including the step of
forming data type signals from the extracted header.

28. The method of claim 18 further including the step of
arbitrating among the voice data processing modules.

29. A system for interworking between ATM formats comprising
an ATM network producing a first data stream carrying voice in a plurality of formats; and
an interworking device receiving the first data stream and including
a plurality of voice data processing modules capable of operating in parallel, each of the modules including
first means for converting the first data stream from one of the plurality of formats to a data stream in an intermediate format, and
second means for converting data streams in the intermediate format to a second data stream;
a router for sending to the appropriate one of the modules portions of the first data stream with the corresponding formats; and
a switch for switching the data stream in the intermediate format between different one of the modules.

30. The system of claim 29 wherein the first data stream includes packets with headers, and
wherein the router includes
means for extracting the headers from the packets,
means for evaluating the headers to determine the formats of the corresponding packets, and
means for causing the packets to arrive at the module corresponding to their formats.

31. The system according to claim 29 further including
a time-division-multiplexed bus connecting the voice data processing modules.

32. The system of claim 29 wherein the first means includes
   means for receiving the first data stream,
   means for processing the first data stream to extract information according to the format corresponding to that module, and
   means for formatting the extracted information in the intermediate format.

33. The system of claim 32 wherein the first means also includes
   buffering means for rate adaption.

34. The system of claim 32 wherein the first means also includes
   means for performing cell delay variation compensation.

35. The system according to claim 32 further including
   a time-division-multiplexed bus connecting the voice data processing modules.

36. The system of claim 35 wherein the means for formatting the extracted information into the intermediate format includes
   means for placing the extracted information into appropriate slots in the time-division-multiplexed bus.

37. The system of claim 32 wherein the second means includes
   means for assembling needed information from the intermediate format,
   means for organizing the assembled information according to the format corresponding to this module, and
   means for placing the organized information into the second data stream.

38. The system according to claim 37 further including
   a time-division-multiplexed bus connecting the voice data processing modules.

39. The system of claim 38 wherein the means for assembling includes
   means for selecting the information from appropriate slots of the time-division-multiplexed bus.

40. The system of claim 29 further comprising
   a time slot interchanger coupled to the voice data processing modules.

41. The system of claim 29 wherein the switch includes
   an egress control circuit for arbitrating among the voice data processing modules.

42. The system of claim 29 wherein the router includes
   ATM ingress circuitry coupled to the voice data processing modules.

43. The system of claim 42 wherein the ATM ingress circuitry includes
   header extraction circuitry for extracting a VPI/VCI header from the first data stream.

44. The system of claim 43 wherein the ATM ingress circuitry includes
   means for forming module identification signals from the extracted header.

45. The system of claim 43 wherein the ATM ingress circuitry includes
   means for forming data type signals from the extracted header.

46. An interworking device receiving a first data stream in a plurality of formats, the device comprising:
   a plurality of data processing modules capable of operating in parallel, each of the modules including
      first means for converting the first data stream from one of the plurality of
   formats to a data stream in an intermediate format, and
      second means for converting data streams in the intermediate format to a
   second data stream,
   a router for sending to the appropriate one of the modules portions of the first data stream with the corresponding formats; and
   a switch for switching the data stream in the intermediate format between different one of the modules.

* * * * *

UNITED STATES PATENT AND TRADEMARK OFFICE
CERTIFICATE OF CORRECTION

PATENT NO. : 5,999,529

DATED : December 7, 1999

INVENTOR(S) : GREG M. BERNSTEIN and JEFFREY T. GULLICKSEN

It is certified that error appears in the above-identified patent and that said Letters Patent is hereby corrected as shown below:

Claim 1, col. 6, line 32, before "a router", delete "to";

Claim 29, col. 8, line 56, change "one" to --ones--;

Claim 46, col. 10, line 37, change "one" to --ones--;

Signed and Sealed this

Twenty-fifth Day of July, 2000

Attest:

Attesting Officer

Q. TODD DICKINSON

Director of Patents and Trademarks